United States Patent
Roberts

(10) Patent No.: US 8,323,151 B2
(45) Date of Patent: Dec. 4, 2012

(54) SYSTEM AND METHOD OF DRIVING AND CONTROLLING PNEUMATIC AND HYDRAULIC SYSTEMS

(75) Inventor: Colin Roberts, Longview, TX (US)

(73) Assignee: Capacity of Texas, Inc., Longview, TX (US)

( * ) Notice: Subject to any disclaimer, the term of this patent is extended or adjusted under 35 U.S.C. 154(b) by 571 days.

(21) Appl. No.: 12/686,041

(22) Filed: Jan. 12, 2010

(65) Prior Publication Data

US 2010/0113221 A1 May 6, 2010

(51) Int. Cl.
*F16H 61/00* (2006.01)
*F16H 61/14* (2006.01)
*B60K 17/00* (2006.01)

(52) U.S. Cl. .................. 477/168; 180/306; 180/307

(58) Field of Classification Search ............ 477/168; 180/306, 307
See application file for complete search history.

(56) References Cited

U.S. PATENT DOCUMENTS

| | | |
|---|---|---|
| 3,057,499 A | 10/1962 | Dorkins |
| 3,163,253 A | 12/1964 | Gibson et al. |
| 3,360,280 A | 12/1967 | Betchart |
| 3,819,076 A | 6/1974 | Oehler |
| 5,401,046 A | 3/1995 | Schwartz et al. |
| 6,860,726 B2 | 3/2005 | Carter, III et al. |
| 7,040,425 B2 | 5/2006 | Hammonds |
| 7,163,226 B1 | 1/2007 | Norton et al. |
| 2006/0078445 A1 | 4/2006 | Carter, III et al. |
| 2006/0207822 A1* | 9/2006 | Taylor .................... 180/326 |
| 2007/0222185 A1 | 9/2007 | Domine |
| 2009/0139792 A1* | 6/2009 | Chisholm et al. ......... 180/307 |
| 2009/0194361 A1 | 8/2009 | Eisenbarth |

* cited by examiner

*Primary Examiner* — Tisha Lewis
(74) *Attorney, Agent, or Firm* — Hovey Williams LLP

(57) ABSTRACT

Systems and methods of driving and controlling pneumatic and hydraulic devices and, more particularly, to a system and method of driving a hydraulic pump via one output shaft of a motor, and driving a pneumatic compressor via another output shaft of the motor via a clutch. When a user control is engaged, a control system causes the motor to operate at a higher speed, driving the hydraulic pump faster to produce additional hydraulic pressure. When a low air pressure condition is sensed in the pneumatic system, the control system causes the motor to operate at the higher speed and engages the clutch, allowing the pneumatic compressor to supply additional air pressure.

18 Claims, 2 Drawing Sheets

SYSTEM AND METHOD OF DRIVING AND CONTROLLING PNEUMATIC AND HYDRAULIC SYSTEMS

FIELD OF INVENTION

The present invention relates generally to systems and methods of driving and controlling pneumatic and hydraulic devices and, more particularly, to a system and method of driving a hydraulic pump via one output shaft of a motor, and driving a pneumatic compressor via another output shaft of the motor via a clutch. When a user control is engaged, a control system causes the motor to operate at a higher speed, driving the hydraulic pump faster to produce additional hydraulic pressure. When a low air pressure condition is sensed in the pneumatic system, the control system causes the motor to operate at the higher speed and engages the clutch, allowing the pneumatic compressor to supply additional air pressure.

BACKGROUND

Many machines produced today utilize pneumatic and hydraulic systems to power various systems. For example, terminal tractors are specialty vehicles which are used to move semi trailer equipment from point to point around a yard. One type of terminal tractor utilizes a hydraulically activated "5th wheel"—essentially a horseshoe shaped coupling device into which the coupling pin of a trailer is attached. When a trailer is not coupled to a vehicle, it generally stands on static supports at its front, and on wheels at its back. When a trailer is engaged with and coupled to a vehicle having a 5th wheel, hydraulic cylinders lift the 5th wheel via a boom to raise the front of the trailer off of its front supports. In this way, the vehicle can move the trailer.

In current terminal tractors, hydraulic pressure is generated from a hydraulic pump driven by a combustion engine. Generally, when the 5th wheel of a terminal tractor engages a trailer, the terminal tractor is stationary and the engine is therefore idling. At idle speeds, standard motors generally produce sufficient hydraulic pressure to power the hydraulically assisted steering of the tractor, but may not produce sufficient pressure to extend the 5th wheel boom to lift a heavy trailer. As such, workers will often rev the engine during such 5th wheel lifts, causing the engine to operate at a higher rpm than its idle speed. This causes hydraulic pumps within the vehicle to pump faster, producing substantially more hydraulic pressure which allows the 5th wheel to extend and support a trailer. Some vehicles require the operator to step on both the accelerator and the brake at the same time to accomplish a higher motor rpm level, which can harm the vehicle.

Additionally, in current terminal tractors, pneumatic pressure is generated from an air compressor which is powered by a motor. Pneumatic pressure is often utilized in braking systems of such vehicles. As air pressure it utilized to apply brakes, the air compressor is engaged to supply additional pressure. However, as above with the hydraulic systems, there are times that additional power is needed to supply adequate air pressure in many vehicles.

Thus, there is a need for an improved system and method for driving and controlling pneumatic and hydraulic systems, in which vehicle motors are controlled so as to output sufficient power to drive pneumatic and hydraulic systems as needed.

SUMMARY OF THE INVENTION

The present invention provides a vehicle power system which may preferably be used in a terminal tractor. The system includes a variable speed motor having first and second output shafts, which motor normally operates in a standard RPM mode. A hydraulic pump is connected to and powered by the first output shaft, and a first number of gallons per minute (GPM) of hydraulic fluid flow from said hydraulic pump, and preferably four GPM, is diverted to power a first vehicle system, which is preferably a power steering system. The remaining GPM of hydraulic fluid flow is directed to power a second vehicle system, which is preferably a 5th Wheel system. Thus, the motor powers the hydraulic pump, which in turn provides hydraulic pressure for the power steering and 5th Wheel operation of a terminal tractor. Additionally, a pneumatic compressor is connected to the second output shaft by a clutch, which selectively engages the second output shaft to the pneumatic compressor to power the pneumatic compressor. The clutch engages the second output shaft with the pneumatic compressor when low air pressure is detected in a pneumatic system, which is preferably a braking system. Thus, the motor powers the pneumatic compressor to replenish air pressure for the braking system when low air pressure is detected in the braking system.

Additionally, a user control is operable to initiate a high RPM mode of the motor, which high RPM mode causes the motor to operate at a higher RPM than does the standard RPM mode. For example, in one embodiment, in the standard RPM mode, the motor may operate at between approximately 500-RPM and 1000-RPM, while the motor may operate at between approximately 1700-RPM and 2200-RPM in the high RPM mode. More preferably, the motor may operate at approximately 1000-RPM in the standard RPM mode, while operating at approximately 2000-RPM in the high RPM mode. In doing so, the high RPM mode increases the power provided to the hydraulic pump, in turn causing the hydraulic pump to generate more hydraulic pressure. As the first number of GPM diverted to the first vehicle system preferably remains constant despite the overall increase in hydraulic fluid flow pumped by the hydraulic pump (and therefore the increased hydraulic pressure in the hydraulic system), the hydraulic pressure provided to the second vehicle system is thereby increased. Thereby, the user control allows an operator to cause the system to provide added power to the second vehicle system when so directed.

Another embodiment of the present invention provides for a method of powering vehicle systems. Such method includes running a variable speed motor in a standard RPM mode, and powering a hydraulic pump by a first output shaft of the motor. A first number of GPM of hydraulic fluid flow is then diverted to power a first vehicle system, while the remaining hydraulic fluid flow is directed to power a second vehicle system. When a user control is actuated, the motor is run in a high RPM mode to increase the GPM output by the hydraulic pump to provide additional hydraulic power to the second vehicle system. Additionally, air pressure is monitored in a pneumatic system, and a pneumatic compressor is connected to a second output shaft of the motor via a clutch to power the compressor when a low air pressure condition is detected.

Further areas of applicability of the present invention will become apparent from the detailed description provided hereinafter. It should be understood that the detailed description and specific examples, while indicating several embodiments of the present invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION

Figure 1:
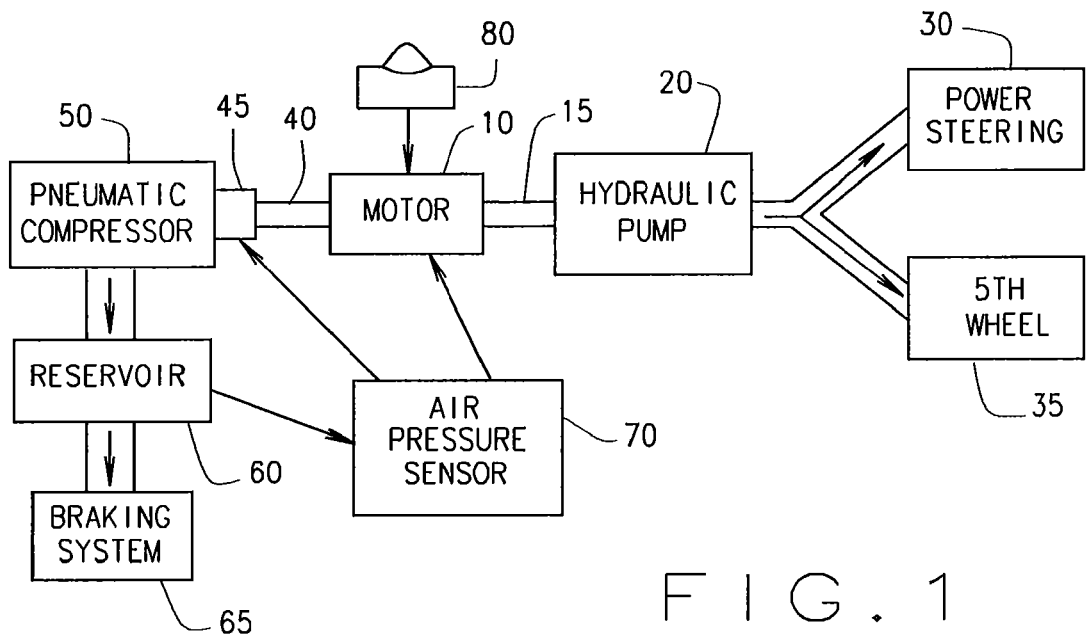
FIG. 1 is a block diagram of one embodiment of a system for driving and controlling pneumatic and hydraulic systems.

The following description of the preferred embodiment(s) is merely exemplary in nature and is in no way intended to limit the various embodiments of the present invention, its applications, or uses.

Although the systems and methods of driving and controlling pneumatic and hydraulic systems described herein are preferably used in connection with terminal tractors, their uses are not so limited and it is recognized and anticipated that the present systems and methods can be utilized in a wide variety of different vehicular and non-vehicular applications as will be hereinafter evident. With respect to the reference numbers used in the drawings, like numerals refer to like parts.

As seen in FIG. 1, a motor 10, which is preferably a variable speed motor but which may be a dual speed motor, is provided. Motor 10 may itself be an internal combustion motor, or may be an electric motor powered by an electrical system such as that in a hybrid vehicle. Motor 10 has a first output shaft 15, which is connected to a hydraulic pump 20. As motor 10 operates, it drives output shaft 15, which in turn powers hydraulic pump 20. Preferably, motor 10 drives hydraulic pump 20 continuously while motor 10 is in operation. Hydraulic pump 20 thereby supplies hydraulic pressure to various vehicle systems, as will be discussed in detail below in connection with FIG. 2.

Motor 10 also has a second output shaft 40, which engages a pneumatic compressor 50 via clutch 45. When clutch 45 engages output shaft 40 with pneumatic compressor 50, motor 10 drives output shaft 40, which in turn powers pneumatic compressor 50. When clutch 45 disengages output shaft 40 from pneumatic compressor 50, motor 10 drives output shaft 40, but does not power pneumatic compressor 50. As a result, clutch 45 engages only when pneumatic compressor 50 is needed to supply additional air pressure to various vehicle systems, such as vehicle braking system 65.

Pneumatic compressor 50, when driven by motor 10 via output shaft 40 and clutch 45, compresses ambient air, which compressed air is then directed to and stored within high-pressure reservoir 60 for use by braking system 65 as needed. It will be understood that other vehicle systems may utilize pneumatic pressure as well by drawing stored compressed air from reservoir 60. Air pressure within reservoir 60 is detected by air pressure sensor 70, which signals clutch 45 to engage output shaft 40 with the pneumatic compressor 50 when air pressure in the reservoir 60 is depleted to a certain level. As a result, motor 10 drives pneumatic compressor 50 via output shaft 40 and clutch 45 to replenish air pressure within reservoir 60 when air pressure sensor 70 detects low air pressure within reservoir 60. However, when sufficient air pressure is detected within reservoir 60, clutch 45 is disengaged so that motor 10 does not drive pneumatic compressor 50 to increase air pressure within the pneumatic system.

Figure 2:
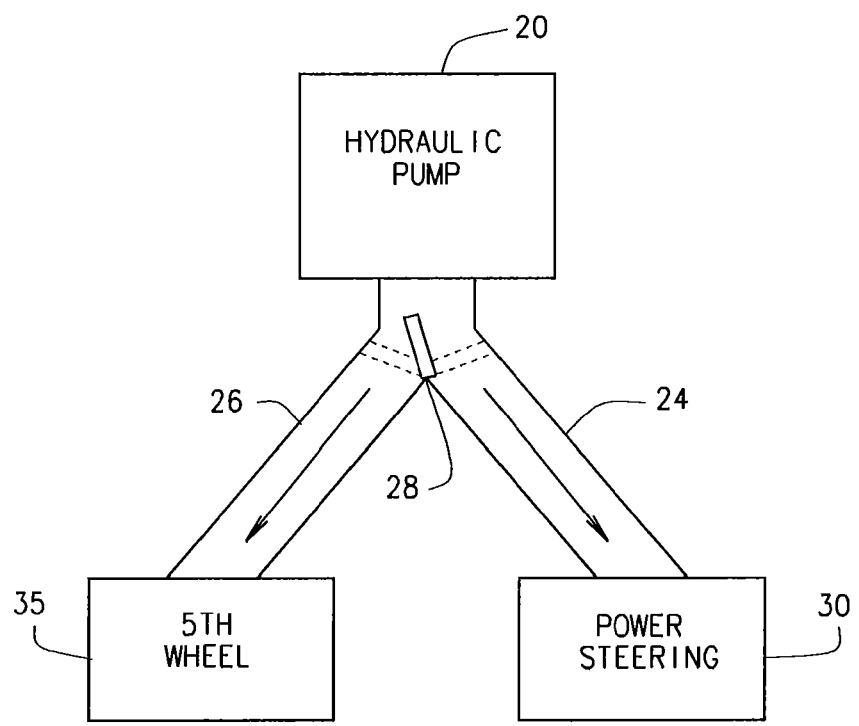
FIG. 2 is a block diagram of a hydraulic pump system according to one embodiment of the present invention.

As mentioned above, motor 10 also drives hydraulic pump 20 via output shaft 15. As hydraulic pump 20 is driven by motor 10, hydraulic fluid (and therefore hydraulic pressure) is provided to various vehicle systems. As best shown in FIG. 2, such vehicle systems are shown as a power steering system 30 and a 5th Wheel system 35, as would be the case in a terminal tractor. However, it should be recognized that other types of hydraulic systems could be similarly utilized. Power steering system 30 may require only a fraction of the overall hydraulic fluid flow and pressure generated by hydraulic pump 20. For example, the power steering system 30 can require about 4-6 gallons per minute (GPM) of hydraulic fluid flow to allow sufficient steering control over a terminal tractor.

As such, the remaining GPM of hydraulic fluid flow from hydraulic pump 20 can be selectively diverted to other vehicle systems which require hydraulic pressure, such as a 5th Wheel system 35. In FIG. 2, hydraulic fluid flow is illustrated as being controlled by a simple valve 28 which directs a portion of hydraulic fluid flow through either hose 24 to the power steering system 30, or through hose 26 to the 5th Wheel system 35. It is noted that the specific configuration and design of valve 28 is not limited to that shown in FIG. 2. Valve 28 may be a spring-plate value, a swash-plate valve, an electronically controlled valve or any other valve capable of diverting hydraulic fluid flow to the power steering system 30 and 5th Wheel system 35 as described above. In any case, in a preferred embodiment, valve 28 is positioned relative to the overall hydraulic fluid flow being pumped by hydraulic pump 20 to allow a first number of GPM, and more preferably approximately 4-6 GPM, of hydraulic fluid flow to the power steering system 30 regardless of the overall amount of hydraulic fluid flowing into valve 28, selectively diverting the remaining hydraulic fluid flow to the 5th Wheel system 35.

In normal operation, motor 10 operates in a standard RPM mode, which is preferably a mode in which motor 10 operates at an idle speed. In standard RPM mode, motor 10 drives hydraulic pump 20 to pump a first amount of hydraulic fluid, thereby creating a first amount of hydraulic pressure. As discussed above, a first number of GPM are then directed to a first vehicle system, such as directing approximately 4-6 GPM to the power steering system 30, while the remaining GPM are directed to the 5th Wheel system 35. However, as would be understood by one of ordinary skill in the art, some vehicle systems, such as 5th Wheel system 35, require substantially more hydraulic pressure during certain load-intensive activities than at other times. For example, the 5th Wheel system 35 of a terminal tractor may require essentially no or little hydraulic pressure when disconnected from a trailer. However, upon engaging a trailer with the 5th Wheel, terminal tractors need substantially increased hydraulic pressure to lift the trailer from its front supports so as to be able to move the trailer as needed. When motor 10 is operating in its standard RPM mode, the amount of hydraulic pressure generated by hydraulic pump 20 may be insufficient to allow the 5th Wheel system 35 to lift such a trailer.

Therefore, a user control 80 (FIG. 1) is provided which can be toggled to initiate a high RPM mode in motor 10 in which motor 10 operates at an increased speed. When user control 80 is engaged, the high RPM mode of motor 10 causes output shaft 15 to increase its RPM, thereby driving hydraulic pump 20 to pump additional hydraulic fluid and generate added hydraulic pressure. Further, since valve 28 ensures that only a first number of GPM of hydraulic fluid, and preferably 4-6 GPM, flows to the power steering system 30 even during the high RPM mode, substantially all of the increased GPM of hydraulic fluid flow is then directed to the 5th Wheel system 35. This allows the 5th Wheel system 35 to lift trailers which could not be lifted with the hydraulic pressure generated when motor 10 is operating in standard RPM mode.

It is noted that air pressure sensor 70 may also initiate high RPM mode in motor 10, along with engaging clutch 45, when air pressure sensor detects low air pressure in reservoir 60. As can be seen, when user control 80 induces the high RPM mode in motor 10, pneumatic compressor 50 is not necessarily driven with increased power, or at all, unless clutch 45 engages the pneumatic compressor 50 with output shaft 40. However, where air pressure sensor 70 initiates the high RPM mode in motor 10 and engages clutch 45 to cause an increase in air pressure in reservoir 60, motor 10 will also drive hydraulic pump 20 with increased power, whether or not the hydraulically powered vehicle systems 30, 35 require additional hydraulic pressure. In such a situation, the additional flow of hydraulic fluid pumped by the hydraulic pump 20 may be dumped back into a hydraulic fluid reservoir (not shown).

Figure 3:
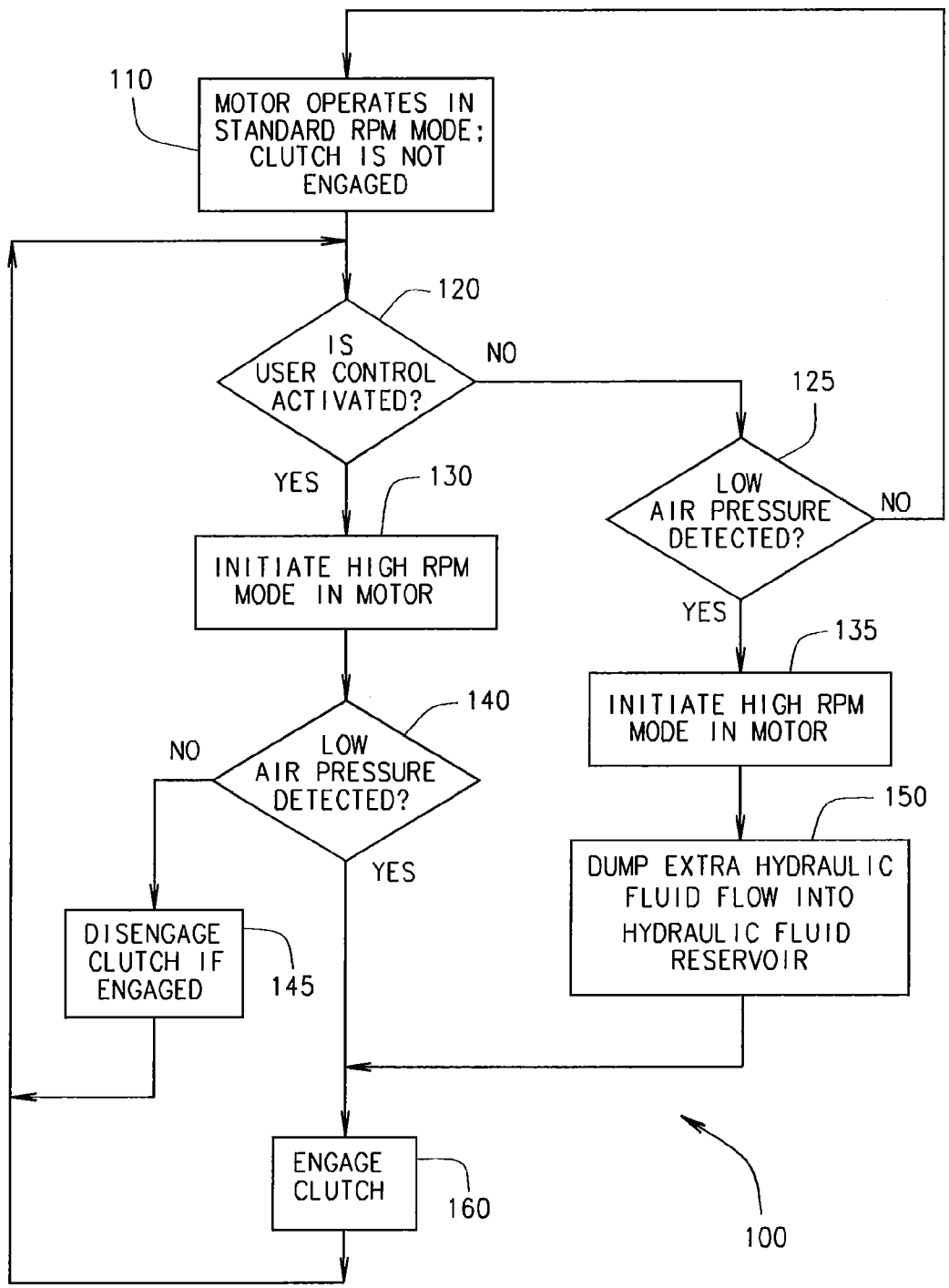
FIG. 3 is a flow chart of one embodiment of a method for driving and controlling pneumatic and hydraulic systems.

Referring now to FIG. 3, a flow chart of a method of controlling pneumatic and hydraulic systems 100 according to one embodiment of the present invention is show. At step 110, the motor 10 is set to operate in standard RPM mode, and clutch 45 is disengaged. At step 120, a check is made to determine whether user control 80 has been activated. If user control 80 has been engaged, the high RPM mode of motor 10 is initiated at step 130 to cause an increase in hydraulic pressure generated by hydraulic pump 20. At step 140, a check is made to determine whether reservoir 60 contains low air pressure. If not, the clutch is disengaged (if engaged) or remains unengaged (if not engaged) at step 145, and method returns to step 120. If low air pressure is detected at step 140, the clutch 45 is engaged at step 160, causing pneumatic compressor 50 to replenish the air pressure in reservoir 60. The method then returns to step 120.

If, at step 120, the user control has not been activated, a check is made to determine whether reservoir 60 contains low air pressure at step 125. If low air pressure is detected at step 125, the high RPM mode is initiated in motor 10 at step 135. This has the side affect of causing hydraulic pump 20 to increase the GPM of hydraulic fluid being pumped, and therefore at step 150 such additional hydraulic fluid flow is dumped into the hydraulic fluid reservoir. At step 160, clutch 45 is then engaged to allow motor 10, operating in the high RPM mode, to drive pneumatic compressor 50 to replenish the air pressure in reservoir 60.

It is noted that when pneumatic compressor 50 is engaged with motor 10, the pneumatic pressure generated by the compressor 50 when motor 10 is operating in standard RPM mode may be sufficient to replenish the air pressure in reservoir 60 without the need for motor 10 to operate in the high RPM mode. As such, in an alternate embodiment, at step 125 when low air pressure is detected in reservoir 60, step 135 may be skipped such that the motor 10 continues to operate in standard RPM mode. In that circumstance, step 150 may also be skipped, as there may be little or no extra hydraulic fluid flow to dump. As such, where low air pressure is detected at step 125, the method may advance directly to step 160 where clutch 45 is engaged.

Thus, there has been shown and described several embodiments of a system and method of driving and controlling pneumatic and hydraulic systems for use in association with various vehicles, which fulfill all of the objects and advantages sought therefore. As various modifications could be made to the exemplary embodiments as described above with reference to the corresponding illustrations without departing from the spirit and scope of the present invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the above disclosures, their equivalents, and the claims which follow.

What is claimed is:

1. A vehicle power system comprising:
    a variable speed motor, said motor having first and second output shafts and normally operating in a standard RPM mode;
    a hydraulic pump powered by said first output shaft wherein a first number of gallons per minute (GPM) of hydraulic fluid flow from said hydraulic pump is directed to power a first vehicle system, and wherein the remaining hydraulic fluid flow is selectively diverted to power a second vehicle system;
    a pneumatic compressor connected to said second output shaft by a clutch, said clutch selectively engaging the second output shaft to power the pneumatic compressor, wherein said clutch is adapted to selectively engage the second output shaft with the pneumatic compressor when low air pressure is detected in a pneumatic system reservoir; and
    a user control operable to initiate a high RPM mode of said motor, wherein the high RPM mode causes said motor to operate at a higher RPM than said standard RPM mode, said high RPM mode increasing power provided to the hydraulic pump to cause an increase in the hydraulic pressure flowing to said second vehicle system, thereby providing added power to the second vehicle system.

2. The vehicle power system of claim 1 wherein the variable speed motor is a dual speed motor having a standard RPM mode and a high RPM mode.

3. The vehicle power system of claim 1 wherein the first number of GPM of hydraulic fluid flow which is diverted to power the first vehicle system is approximately four GPM.

4. The vehicle power system of claim 1 wherein the first vehicle system is a power steering system.

5. The vehicle power system of claim 1 wherein the second vehicle system is a 5th Wheel lift system.

6. The vehicle power system of claim 1 including a pressure sensor for detecting low air pressure in the vehicle pneumatic system reservoir.

7. The vehicle power system of claim 1 wherein the user control is engaged when the second vehicle system requires an increased hydraulic flow rate for increased hydraulic power.

8. The vehicle power system of claim 1 wherein a detection of low air pressure engages the high RPM mode in the motor.

9. A method of powering vehicle systems comprising:
    running a variable speed motor in a standard RPM mode;
    powering a hydraulic pump by a first output shaft of said motor;
    directing a first number of GPM of hydraulic fluid flow to power a first vehicle system;
    selectively diverting the remaining hydraulic fluid flow to power a second vehicle system;
    running said motor in a high RPM mode upon the engagement of a user control, said high RPM mode increasing the GPM output by the hydraulic pump to provide additional hydraulic power to said second vehicle system;
    monitoring air pressure in a pneumatic system reservoir; and
    connecting a pneumatic compressor to a second output shaft of said motor via a clutch to power said compressor when a low air pressure condition is detected.

10. The method of powering vehicle systems of claim 9 wherein said motor is a dual speed motor having a standard RPM speed and a high RPM speed.

11. The method of powering vehicle systems of claim 9 wherein said first number of GPM which is diverted to said first vehicle system is approximately four GPM.

12. The method of powering vehicle systems of claim 9 wherein said first vehicle system is a power steering system.

13. The method of powering vehicle systems of claim 9 wherein the second vehicle system is a 5th Wheel lift system.

14. The method of powering vehicle systems of claim 9 wherein the pneumatic system is a pneumatic braking system.

15. The method of powering vehicle systems of claim 9 wherein the user control is engaged when the second vehicle system requires an increased hydraulic flow rate for increased hydraulic power.

16. The method of powering vehicle systems of claim 9 wherein a low air pressure condition also causes the motor to run in said high RPM mode.

17. A vehicle power system comprising:
   a first vehicle system powered by a hydraulic pump, a first number of GPM of hydraulic fluid flow generated by said hydraulic pump being directed to said first vehicle system;
   a second vehicle system powered by said hydraulic pump, the remaining GPM of hydraulic fluid flow after said first number of GPM has been directed to said first vehicle system being selectively diverted to said second vehicle system; and
   a user control operable to switch a variable speed motor from a standard RPM mode to a high RPM mode, said high RPM mode causing said motor to operate at a higher RPM than said standard RPM mode, wherein said motor powers said hydraulic pump and said high RPM mode increases power provided to the hydraulic pump to cause an increase in the hydraulic pressure generated by said hydraulic pump, thereby providing added power to the second vehicle system.

18. The system of claim 17 further including:
   a clutch connected to a pneumatic pump; and
   an air pressure sensor for detecting air pressure within a high pressure compressed air reservoir, said air pressure sensor operable to cause said clutch to selectively engage said motor to drive said pneumatic compressor pump when a low air pressure state is detected within said reservoir thereby powering said pneumatic compressor to replenish the air pressure within said reservoir.

* * * * *